Patented Jan. 12, 1932

1,840,326

UNITED STATES PATENT OFFICE

KARL OTT AND HERIBERT SCHÜSSLER, OF UERDINGEN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF YELLOW IRON OXIDE PIGMENTS

No Drawing. Application filed June 30, 1928, Serial No. 289,609, and in Germany July 1, 1927.

The invention relates to the production of iron oxide pigments and especially comprises a process of producing a yellow hydroxide of trivalent iron suitable as a pigment by oxidizing a precipitate containing the iron substantially in the bivalent state.

When a precipitate of ferrous hydroxide or ferrous carbonate is oxidized in a relatively uncontrolled manner without peculiar precautions brownish pigments of inferior quality or, if the reaction is carried out at about boiling temperature (100° C.) brown black to blue black pigments are obtained.

We have found that yellow pigments having an approximate chemical composition indicated by the formula FeO.OH are produced by oxidizing a precipitate containing a compound of bivalent iron and obtained by adding an alkaline acting substance to a ferrous salt solution in the presence of a salt of a trivalent metal. By carrying out the oxidation in this manner homogeneous yellow pigments can be obtained even at high temperatures (100° C. and above) but also lower temperatures may be used. We prefer to oxidize at a temperature from about 40° C. to the boiling point of the liquors employed.

One method of carrying out our invention consists in precipitating ferrous hydroxide or ferrous carbonate from a ferrous salt solution by means of the calculated amount of a basic substance such as sodium carbonate, calcium hydroxide, sodium hydroxide etc. adding say a ferric salt solution and then introducing at 90 to 100° C. a sodium carbonate solution in small proportions, if desired while slowly and continually passing a gas containing oxygen through the mixture, until the solution remains neutral. It is obvious that the ferric salt by itself exerts an oxidizing effect and that even without the aid of a gas containing oxygen the ferrous hydroxide precipitate can be oxidized.

In other cases it is preferable to start from a ferrous salt solution containing substantial quantities of a salt of a trivalent metal precipitable with an alkaline acting agent. To this solution for example sodium carbonate solution is allowed to slowly run in at an elevated temperature while continually passing a current of a gas containing oxygen through the mixture.

In both cases after washing and drying the precipitate finely divided yellow to reddish yellow pigments having a brilliant color and high luster and an excellent coloring strength are obtained. These pigments are almost free from acid (in the form of basic salts) and are found to carry no carbonic acid. On an average they contain about 12 to 13 percent of water and 85 to 87 percent of $Fe_2O_3$.

The following examples will illustrate our invention, but obvious modifications will occur to a person skilled in the art and are considered to be covered by our claims.

Example 1

14 kgs. of ferrous sulfate are dissolved in 70 litres of water and heated to 90 to 95° C. Then 1 kg. of sodium carbonate (dissolved in from 6 to 10 litres of water) is added as quickly as possible and thereupon 5 kgs. of a 50 percent ferric chloride solution. The temperature is again raised at 90 to 95° C. and the mixture stirred for half an hour while continually passing a current of air through it. The color of the precipitate which is a dark brown after the addition of the ferric chloride is brightened a little by the oxidation. A further addition of 5 kgs. of 50 percent ferric chloride solution and further blowing air through the mixture for about half an hour makes the color lighter and lighter and at last it attains a dull yellow which is not changed by further oxidation. At this point a 10 to 15 percent aqueous solution containing 6.9 kgs. of sodium carbonate while continually blowing with air is allowed to run into the mixture at such a rate as to maintain acid reaction, which is indicated by the yellow color of the precipitate. As soon as the yellow color changes to green the addition of the soda solution is to be stopped. Provided a normal course of the oxidation the addition of the soda is finished within 5 to 6 hours. The blowing of air at 90 to 95° C. through the mixture is continued till the desired clear shade of the pigment is obtained.

Then the precipitate is filtered, washed out and dried at about 100° C.

Example 2

21 kgs. of ferrous sulfate dissolved in 100 litres of water are heated to 90° C. and mixed with 18 kgs. of a 50 percent ferric chloride solution. While agitating the mixture 5 kgs. of sodium carbonate (aqueous solution containing 15 percent) are allowed to slowly run in at 90 to 95° C. in the course of 2 hours. The yellowish color of precipitate is slightly shifted to green, but the original yellow color reappears by oxidation with air. While continually oxidizing with a current of air further 11,8 kgs. of sodium carbonate (in a 10 to 15 percent containing solution) are added at such a rate as to maintain the yellow color. Towards the end of the precipitating process the originally dull color is converted to a bright yellow. Then oxidation is continued until the shade of the color does not get greater brilliancy; the precipitate is filtered, washed out and dried at about 100° C.

Example 3

17,8 kgs. of ferrous sulfate are dissolved in 80 litres of water and 4,9 kgs. of hydrated aluminium chloride added at 90° C. While blowing a current of air through the mixture, an aqueous solution of 8,2 kgs. of sodium carbonate is allowed to slowly run in. The rate in which the soda solution is introduced, is regulated in such a manner that the precipitate has a dull yellow color at the beginning and a bright yellow color at the end of the reaction. A further treatment as shown in Example 1 yields a bright yellow pigment.

Example 4

1000 litres of a ferrous chloride solution (spec. gr. 1,17) and 50 litres of a ferric chloride solution (spec. gr. 1,12) are diluted with 2000 litres of water. Then 20 kgs. of ferrous sulfate are dissolved in the solution and the mixture heated at 100° C. Air is now allowed to pass through the liquid and slaked lime or quick-lime in an amount corresponding to 65 kgs. of calcium hydroxide is gradually added. The oxidation by air is continued, until a pure yellow shade of color is obtained.

We claim:

1. A process of preparing yellow pigments which comprises precipitating a ferrous salt solution with an alkaline acting agent and treating the precipitate in an aqueous suspension with an oxidizing agent in the presence of a substantial proportion of a soluble salt of a trivalent metal.

2. A process of preparing yellow pigments which comprises precipitating a ferrous salt solution with an alkaline acting agent and treating the precipitate in an aqueous suspension with an oxidizing agent at a temperature above 40° C. in the presence of a substantial proportion of a soluble salt of a trivalent metal.

3. A process of preparing yellow pigments which comprises precipitating a ferrous salt solution with an alkaline acting agent and treating the precipitate in an aqueous suspension with an oxidizing agent at a temperature above 40° C. in the presence of an aqueous solution containing a soluble salt of a trivalent metal.

4. A process of preparing yellow pigments which comprises precipitating a ferrous salt solution with an alkaline acting agent and treating the precipitate in an aqueous suspension with an oxidizing agent at a temperature above 40° C. in the presence of an aqueous solution containing a soluble salt of a trivalent metal which is capable of being precipitated with an alkaline acting agent.

5. A process of preparing yellow pigments which comprises precipitating a ferrous salt solution with an alkaline acting agent and treating the precipitate in an aqueous suspension with an oxidizing agent at a temperature above 40° C. in the presence of an aqueous solution containing a soluble salt of a trivalent metal, separating and drying the precipitate at a temperature not substantially exceeding 150° C.

6. A process of preparing yellow pigments which comprises precipitating a ferrous salt solution with an alkaline acting agent and treating the precipitate in an aqueous suspension with an oxidizing agent at a temperature above 40° C. in the presence of an aqueous ferric salt solution.

7. A process of preparing yellow pigments which comprises precipitating an aqueous ferrous sulfate solution with sodium carbonate and treating the precipitate with a current of air at a temperature of about 90 to 95° C. in the presence of an aqueous ferric chloride solution.

In testimony whereof we have hereunto set our hands.

KARL OTT.
HERIBERT SCHÜSSLER.